(12) United States Patent
Richards

(10) Patent No.: US 7,040,210 B2
(45) Date of Patent: May 9, 2006

(54) APPARATUS AND METHOD FOR RESTRAINING AND RELEASING A CONTROL SURFACE

(75) Inventor: Gregory M. Richards, Colleyville, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 76 days.

(21) Appl. No.: 10/369,370

(22) Filed: Feb. 18, 2003

(65) Prior Publication Data

US 2004/0159227 A1    Aug. 19, 2004

(51) Int. Cl.
F41B 10/14    (2006.01)
(52) U.S. Cl. ...................... 89/1.14; 244/3.29
(58) Field of Classification Search ............... 89/1.14; 244/3.24–3.29
See application file for complete search history.

(56) References Cited

U.S. PATENT DOCUMENTS

| | | | | |
|---|---|---|---|---|
| 1,732,581 A | * | 10/1929 | Johnson .................... 403/275 |
| 2,060,864 A | * | 11/1936 | Hedler ...................... 403/275 |
| 2,420,987 A | * | 5/1947 | Temple, Jr. .............. 114/221 A |
| 2,610,376 A | * | 9/1952 | Murana .................... 403/275 |
| 2,939,732 A | * | 6/1960 | Rochester ................ 403/275 |
| 3,074,320 A | * | 1/1963 | Trifonoff .................. 89/1.51 |
| 3,267,539 A | * | 8/1966 | Mark ....................... 403/275 |
| 3,286,630 A | * | 11/1966 | Salmirs et al. ............. 102/377 |
| 3,304,030 A | | 2/1967 | Wiemholt et al. ......... 244/3.28 |
| 3,393,605 A | * | 7/1968 | Parnell ...................... 89/1.14 |
| 3,563,495 A | | 2/1971 | Korn ........................ 244/3.29 |
| 3,838,940 A | * | 10/1974 | Hollrock .................... 416/142 |
| 3,991,649 A | * | 11/1976 | Patrichi .................... 89/1.14 |
| 4,062,112 A | * | 12/1977 | Lake ......................... 30/228 |
| 4,116,130 A | * | 9/1978 | Christopher et al. ........ 102/307 |
| 4,128,071 A | * | 12/1978 | Layman et al. .......... 114/221 A |
| 4,426,053 A | * | 1/1984 | Chenin et al. .............. 244/173 |
| 4,495,849 A | * | 1/1985 | Cooke et al. ................. 89/1.14 |
| 4,588,146 A | * | 5/1986 | Schaeffel et al. .......... 244/3.27 |
| 4,778,127 A | | 10/1988 | Duchesneau ............... 244/3.29 |
| 4,884,766 A | | 12/1989 | Steinmetz et al. ......... 244/3.27 |
| 5,009,374 A | * | 4/1991 | Manfredi et al. ........... 244/1 R |
| 5,177,317 A | * | 1/1993 | Walker et al. ............... 89/1.14 |

(Continued)

FOREIGN PATENT DOCUMENTS

DE       3215432 A1 * 10/1983

(Continued)

OTHER PUBLICATIONS

WO00/48778, Aug. 24, 2000, J. Martin.*

(Continued)

*Primary Examiner*—Troy Chambers
(74) *Attorney, Agent, or Firm*—Daren C. Davis; James E. Walton

(57) ABSTRACT

An apparatus includes a restraint for restraining a first control surface in a stowed configuration and a severing mechanism for parting the restraint to allow the first control surface to move into an operational configuration. A vehicle includes a body, a first control surface rotatably mounted to the body, and a restraint attached to the first control surface for restraining the first control surface in a stowed configuration. The vehicle further includes a severing mechanism for parting the restraint to allow the first control surface to move into an operational configuration. A method includes attaching a restraint to the control surface to restrain the control surface in a stowed configuration and cutting the restraint to allow the control surface to move to an operational configuration.

18 Claims, 3 Drawing Sheets

U.S. PATENT DOCUMENTS

| | | | | |
|---|---|---|---|---|
| 5,361,676 A | * | 11/1994 | Gibbs | 89/1.14 |
| 5,364,046 A | * | 11/1994 | Dobbs et al. | 244/161 |
| 5,368,255 A | * | 11/1994 | August | 244/3.28 |
| 5,582,364 A | | 12/1996 | Trulin et al. | 244/3.29 |
| 5,950,963 A | | 9/1999 | Speicher et al. | 244/3.21 |
| 6,250,584 B1 | | 6/2001 | Hsu et al. | 244/3.24 |
| 6,352,217 B1 | | 3/2002 | Hsu et al. | 244/3.24 |
| 6,439,122 B1 | * | 8/2002 | Nygren et al. | 102/377 |
| 2004/0007123 A1 | * | 1/2004 | Ritchie et al. | 89/1.14 |

FOREIGN PATENT DOCUMENTS

| | | | |
|---|---|---|---|
| DE | 3818669 C | * | 8/1989 |
| FR | 2319823 A | * | 4/1977 |
| GB | 2140136 A | | 11/1984 |
| JP | 05213291 A | * | 8/1993 |

OTHER PUBLICATIONS

Patent Abstracts of Japan, Application No. 63296140 dated Nov. 25, 1988, Entitled Guided Missile.

* cited by examiner

APPARATUS AND METHOD FOR RESTRAINING AND RELEASING A CONTROL SURFACE

BACKGROUND OF THE INVENTION

1. Field of the Invention

This invention relates to an apparatus and method for restraining and releasing a control surface.

2. Description of the Related Art

Vehicles that traverse a fluid medium, such as rockets, missiles, projectiles, torpedoes, pods, drones, and the like generally have one or more control surfaces, such as wings, fins, or airfoils, that are used to stabilize and/or steer the vehicle as it moves through an atmosphere or liquid. It is often desirable to fold, rotate, or pivot such control surfaces so that the vehicle can be stored in a smaller space. When such a vehicle is launched, biasing members, such as springs, are used to urge the control surfaces into their flight or operational configurations. Clips or other such structures are often used to restrain the control surfaces in their stowed configuration. When the vehicle is launched, the clips are removed from the vehicle, often by the launcher, which allows the control surfaces to be urged into their flight or operational configuration.

Problems may arise, however, if one or more of the clips are not removed from the vehicle. In such a situation, the restrained control surface may inhibit the launched vehicle's ability to properly maneuver, causing the vehicle to become aerodynamically or hydrodynamically unstable. The removed clips may also cause damage if they impact other equipment near the launch site.

In some conventional designs, retractable pins are used to restrain the control surfaces in their stowed configuration. Upon launching the vehicle, the pins are retracted by an actuator, which allows the control surfaces to move to their flight or operational configurations. Such restraining systems are often bulky and heavy, which may impact the performance of the vehicle.

The present invention is directed to overcoming, or at least reducing, the effects of one or more of the problems set forth above.

SUMMARY OF THE INVENTION

In one aspect of the present invention, an apparatus is provided comprising a restraint for restraining a first control surface in a stowed configuration and a severing mechanism for parting the restraint to allow the first control surface to move into an operational configuration.

In another aspect of the present invention, a vehicle is provided. The vehicle includes a body, a first control surface rotatably mounted to the body, and a restraint attached to the first control surface for restraining the first control surface in a stowed configuration. The vehicle further includes a severing mechanism for parting the restraint to allow the first control surface to move into an operational configuration.

In yet another aspect of the present invention a method is provided comprising attaching a restraint to the control surface to restrain the control surface in a stowed configuration and cutting the restraint to allow the control surface to move to an operational configuration.

In another aspect of the present invention, an apparatus is provided comprising means for restraining a first control surface in a stowed configuration and means for parting the means for restraining the first control surface to allow the first control surface to move to an operational configuration.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

Figure 1:
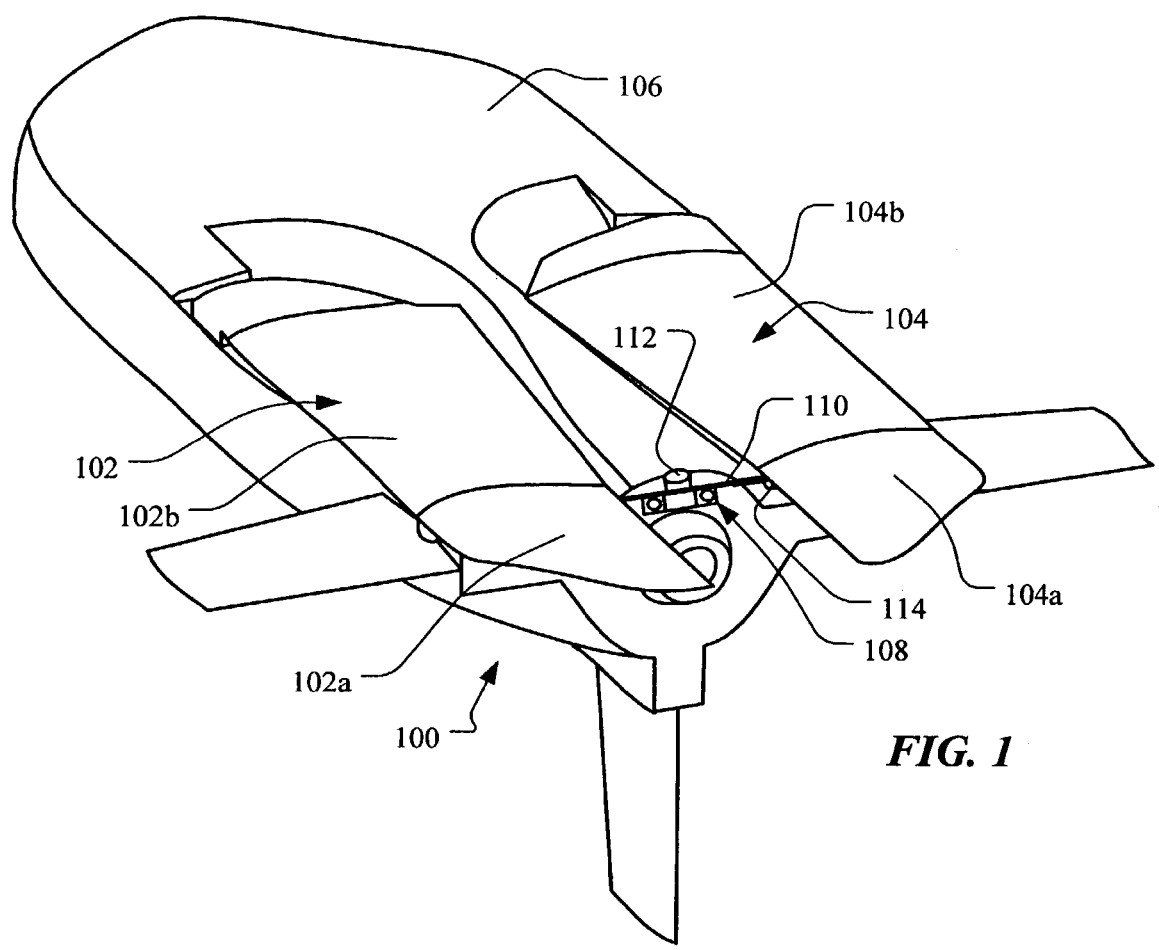
FIG. 1 is a perspective view of an illustrative embodiment of a vehicle according to the present invention having control surfaces in a stowed configuration.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2:
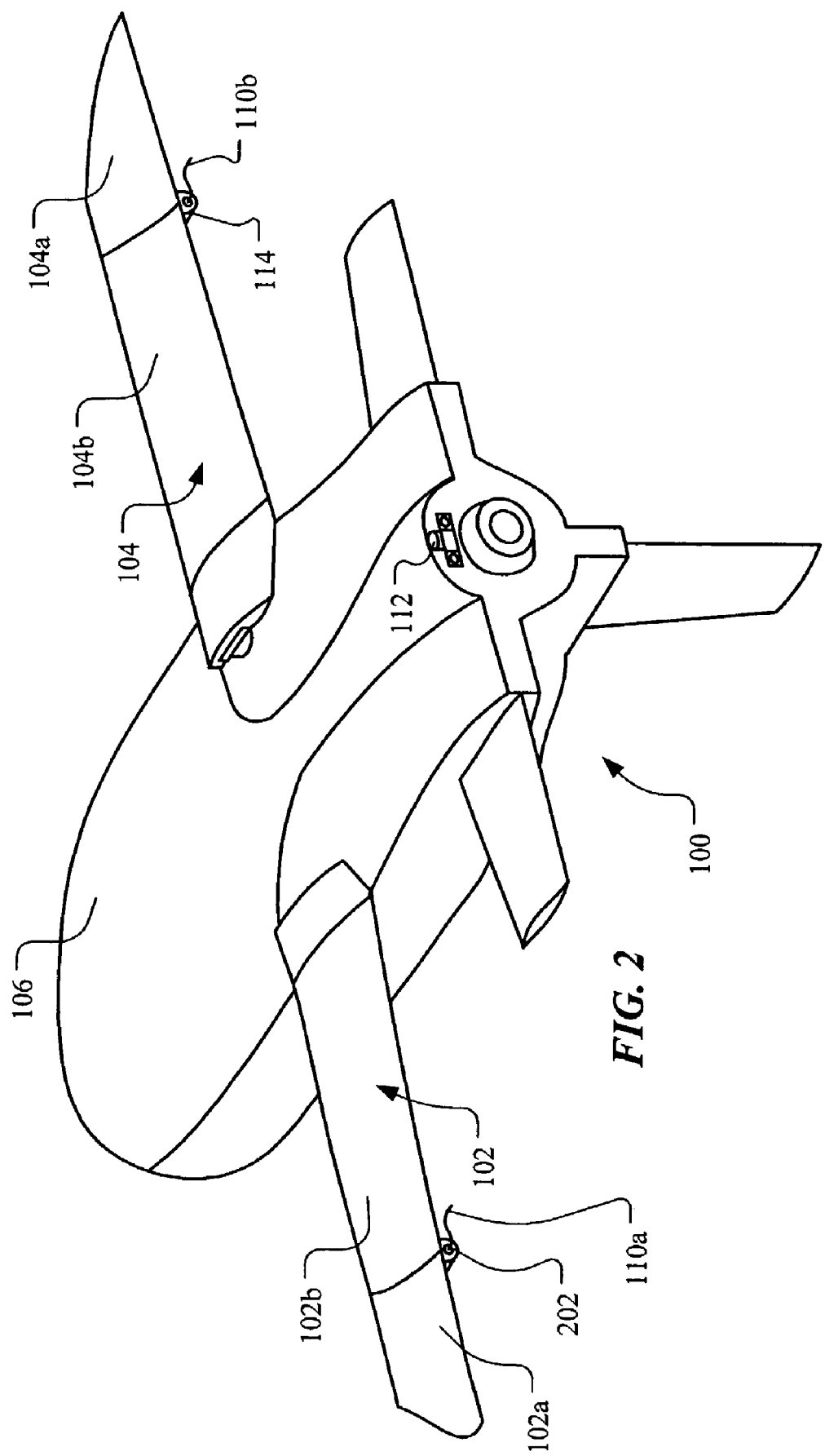
FIG. 2 is a perspective view of the vehicle of FIG. 1 having control surfaces in an operational configuration.

FIGS. 1 and 2 depict an illustrative embodiment of a vehicle 100 according to the present invention including a first control surface 102 and a second control surface 104. The control surfaces 102, 104 are rotatably mounted to a body 106 of the vehicle such that they can be positioned in a stowed configuration, as shown in FIG. 1, or in an operational configuration, as shown in FIG. 2. Generally, the vehicle 100 includes springs or other such members (not shown) for urging the control surfaces 102, 104 into the deployed configuration in a manner known to the art.

The vehicle 100 further includes an apparatus 108 for selectively restraining the control surfaces 102, 104 in the stowed configuration (i.e., the FIG. 1 configuration). In the illustrated embodiment, the apparatus 108 comprises a restraint 110 attached to each of the control surfaces 102, 104 and a severing mechanism 112 attached to the body 106 of the vehicle 100. Thus, by way of example and illustration, the restraint 110 is but one means for restraining the control surfaces 102, 104 in their stowed configurations employed in accordance with the present invention. Further, by way of example and illustration, severing mechanism 112 is but one means for parting the restraint 110 employed in accordance with the present invention.

Referring now specifically to FIG. 2, after deployment, the severing mechanism 112 is actuated and the restraint 110 is parted into a first portion 110a and a second portion 110b, allowing the control surfaces 102, 104 to rotate into the operational configuration, as shown in FIG. 2. In the illustrated embodiment, the first portion 110a and the second portion 110b of the restraint 110 remain attached to the control surfaces 102, 104, respectively. Thus, cutting the restraint 110 to release the control surfaces 102, 104 produces little or no debris. Further, the first portion 110a and the second portion 110b generate little or no aerodynamic or hydrodynamic drag as the vehicle 100 travels.

While the control surfaces 102, 104 are illustrated in FIGS. 1 and 2 as being wings, the present invention is not so limited. Rather the apparatus 108 may be used to restrain and release any chosen control surface, such as fins, stabilizers, and airfoils. Further, the vehicle 100 may take on any chosen form, such as a rocket, a missile, a projectile, a torpedo, a pod, a drone, or the like.

FIGS. 1 and 2 illustrate the restraint 110 as being attached to hinges 114, 202 that, I the illustrated embodiment, allow control surface tips 102a, 104a to fold with respect to control surface bodies 102b, 104b, respectively, during storage. However, the present invention is not so limited. Rather, the scope of the present invention includes the restraint 110 attached in any chosen location on or to any chosen structure of the control surfaces 102, 104. Furthermore, alternative embodiments may omit the control surface tips 102a, 104a.

Figure 3:
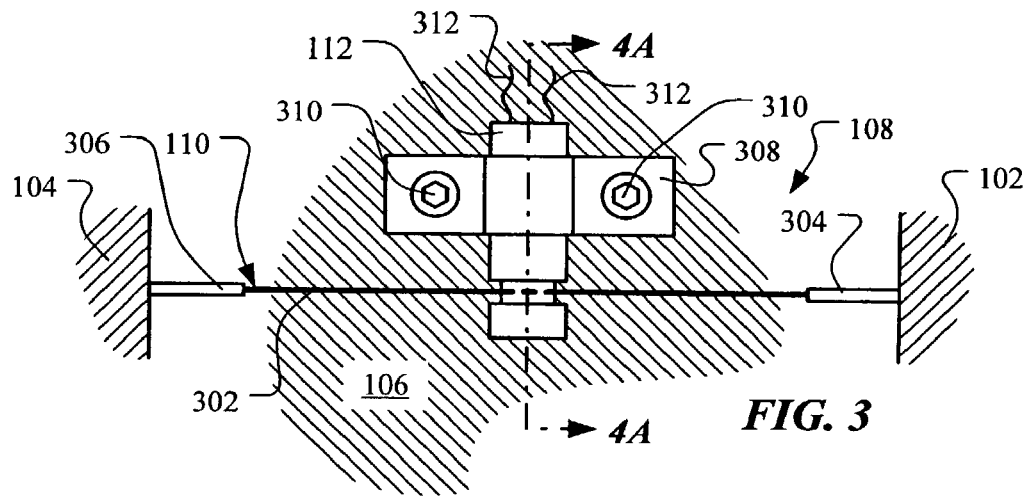
FIG. 3 is a side view of an illustrative embodiment of a restraint/release mechanism according to the present invention attached to two control surfaces.

Referring now to FIG. 3, the restraint 110 in the illustrated embodiment comprises a tether 302 having fittings 304, 306 affixed to each end thereof. As used herein, the term "tether" means an elongated member such as a cable, a wire, a cord, a rope, or the like. In one embodiment, the tether 302 comprises a stainless steel material having a diameter of about one millimeter. In alternative embodiments, the fittings 304, 306 may be omitted, and the tether 302 may be fastened to the control surfaces 102, 104 in some other suitable manner. The fitting 304 is attached to the control surface 102 and the fitting 306 is attached to the control surface 104. The tether 302 extends through the severing mechanism 112 that, in the illustrated embodiment, is attached to the body 106 of the vehicle 100 with a bracket 308 and fasteners 310. The present invention, however, is not so limited. Rather, the tether 302 may be disposed in any chosen relationship to the severing mechanism 112, such that the severing mechanism 112 is capable of parting the tether 302. In the illustrated embodiment, the severing mechanism 112 is actuated by an electrical signal carried to the severing mechanism by one or more wires 312.

Figure 4A:
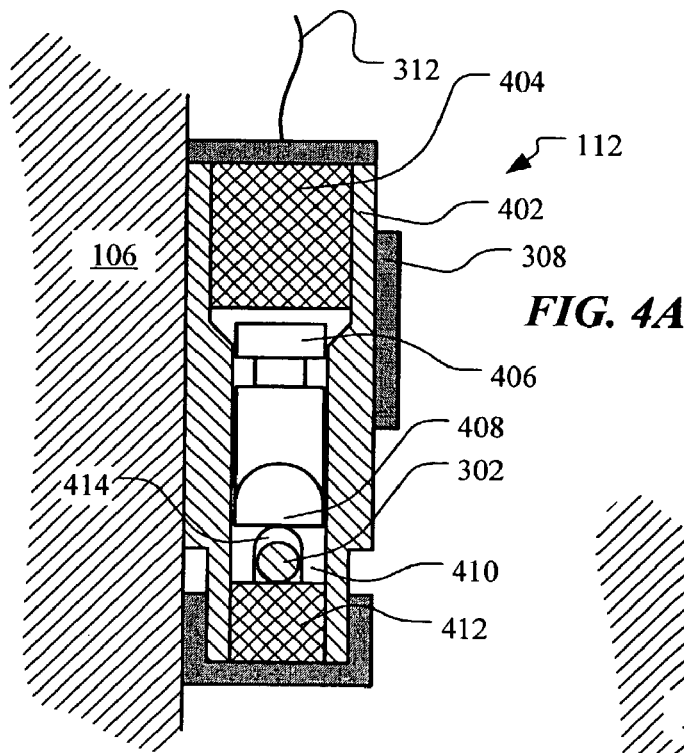
FIG. 4A is a partial cross-sectional view of the restraint/release mechanism of FIG. 3 prior to actuation taken along the line 4A—4A in FIG. 3.

FIG. 4A provides a partial cross-sectional view of one illustrative embodiment of the severing mechanism 112 with the tether 302 extending therethrough, such as a part number 302102 cable cutter manufactured by Cartridge Actuated Devices, Inc. of Fairfield, N.J. In the illustrated embodiment, the severing mechanism 112 comprises a housing 402 that contains an explosive charge 404, a plunger 406 comprising a blade 408, a guide 410, and an anvil 412. The guide 410 defines an opening 414 through which the tether 302 extends.

Figure 4B:
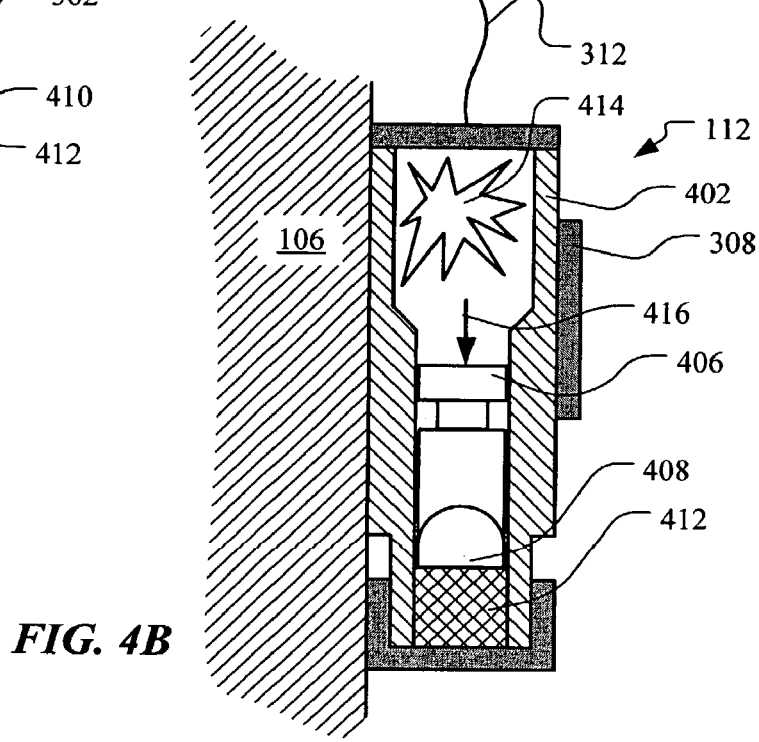
FIG. 4B is a partial cross sectional view of the restraint/release mechanism of FIG. 4A after actuation.

FIG. 4B illustrates actuation of the severing mechanism 112 and, as a result, release of the control surfaces 102, 104. An electrical signal is provided to the explosive charge 404 via the wires 312, which detonates the explosive charge 404 (indicated by the graphic 414). The severing mechanism 112 may also comprise a detonator (not shown) coupled with the wires 312 for improving the detonation of the explosive charge 404. The rapidly expanding gases produced by the detonated explosive charge 404 urge the plunger 406 generally in a direction corresponding to an arrow 416 to drive the plunger 406. The plunger 406 operates against the blade 408 that, as a result, engages and parts the tether 302, thus releasing the control surfaces 102, 104 into their operational configurations.

The present invention, however, is not limited to an explosive-type severing mechanism. Rather, the severing mechanism 112 may alternatively include other types of actuators, such as electrical, pneumatic, or hydraulic actuators, or the like.

Figure 5:
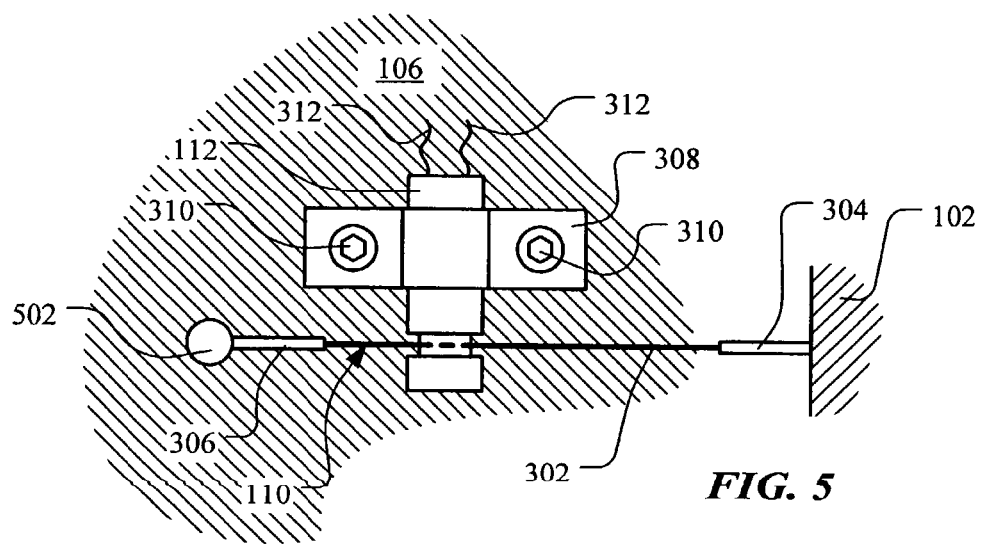
FIG. 5 is a side view of the restraint/release mechanism of FIG. 3 attached to the vehicle and a control surface.

It may be desirable in certain designs to only release one control surface, rather than the two control surfaces 102, 104. As shown in FIG. 5, the restraint 110 may instead be attached between the body 106 (or another portion of the vehicle 100) and the control surface 102. In the illustrated embodiment, the restraint 110 is attached to the body 106 via a member 502; however, the present invention is not so limited. Rather, the restraint 110 may be coupled with the body 106, or to another portion of the vehicle 100, in any chosen fashion.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A vehicle, comprising:
   a body;
   a first control surface rotatably mounted to the body;
   a restraint attached to the first control surface for restraining the first control surface in a stowed configuration; and
   a severing mechanism for parting the restraint to allow the first control surface to move into an operational configuration,
   wherein the restraint extends through the severing mechanism.

2. A vehicle, according to claim 1, wherein the restraint comprises a tether.

3. A vehicle, according to claim 2, wherein the restraint further comprises a fitting coupled with an end of the tether and being attached to the first control surface.

4. A vehicle, according to claim 1, wherein the severing mechanism is an explosively actuated severing mechanism.

5. A vehicle, according to claim 1, wherein the severing mechanism comprises a blade.

6. A vehicle, according to claim 1, further comprising a second control surface rotatably mounted to the body, such that the restraint is attached to the second control surface for restraining the second control surface in a stowed configuration.

7. A vehicle, comprising:
   a body;
   a first control surface rotatably mounted to the body;

a restraint attached to the first control surface for restraining the first control surface in a stowed configuration; and a severing mechanism for parting the restraint to allow the first control surface to move into an operational configuration, wherein the severing mechanism comprises a blade and an explosive charge for urging the blade to sever the restraint.

8. A vehicle, according to claim 7, wherein the severing mechanism further comprises:

a housing in which the explosive charge is disposed;

a plunger disposed within the housing and comprising the blade to be driven by the explosive charge to sever the restraint;

a guide disposed within the housing and defining an opening through which the restraint extends; and an anvil disposed within the housing upon which the restraint is positioned for control with the blade.

9. A vehicle, according to claim 7, wherein the restraint comprises a tether.

10. A vehicle, according to claim 7, wherein the restraint comprises a tether.

11. A vehicle, according to claim 7, further comprising a second control surface rotatably mounted to the body, such that the restraint is attached to the second control surface for restraining the second control surface in a stowed configuration.

12. A vehicle, comprising:

a body;

a first control surface rotatably mounted to the body;

a second control surface rotatably mounted to the body;

a tether;

a first fitting coupled with a first end of the tether and the first control surface; and a second fitting coupled with a second end of the tether and the second control surface; and a severing mechanism for parting the tether to allow the first control surface and the second control surface to move into operational configurations.

13. A method, comprising:

attaching a restraint to a control surface rotatably mounted to a body of a vehicle to restrain the control surface in a stowed configuration; and extending the restraint through a severing mechanism.

14. A method, according to claim 13, wherein attaching the restraint further comprises attaching the restraint to the vehicle.

15. A method, according to claim 13, further comprising attaching the restraint to a second control surface.

16. A method, according to claim 13, further comprising cutting the restraint with the severing mechanism to allow the control surface to move to an operational configuration.

17. A method, according to claim 16, wherein cutting the restraint further comprises explosively actuating the severing mechanism.

18. A method, according to claim 15, further comprising cutting the restraint with the severing mechanism to allow the first and second control surfaces to move to operational configurations.

* * * * *

UNITED STATES PATENT AND TRADEMARK OFFICE
CERTIFICATE OF CORRECTION

| | | |
|---|---|---|
| PATENT NO. | : 7,040,210 B2 | Page 1 of 1 |
| APPLICATION NO. | : 10/369370 | |
| DATED | : May 9, 2006 | |
| INVENTOR(S) | : Gregory M. Richards | |

It is certified that error appears in the above-identified patent and that said Letters Patent is hereby corrected as shown below:

Column 6, Claim 15 should read

-- 15. A vehicle, according to claim 14, wherein the severing mechanism further comprises:
a housing in which the explosive charge is disposed;
a plunger disposed within the housing and comprising the blade to be driven by the explosive charge to sever the restraint;
a guide disposed within the housing and defining an opening through which the restraint extends; and an anvil disposed within the housing upon which the restraint is positioned for contact with the blade. --

Signed and Sealed this

Twelfth Day of September, 2006

JON W. DUDAS
*Director of the United States Patent and Trademark Office*